(12) United States Patent
Xu et al.

(10) Patent No.: US 11,435,834 B2
(45) Date of Patent: Sep. 6, 2022

(54) KEYBOARD

(71) Applicant: Shenzhen Lingdianlingyi Technology Co., Ltd., Shenzhen (CN)

(72) Inventors: Jian Xu, Shenzhen (CN); Jilei Guan, Shenzhen (CN)

(*) Notice: Subject to any disclaimer, the term of this patent is extended or adjusted under 35 U.S.C. 154(b) by 0 days.

(21) Appl. No.: 17/399,074

(22) Filed: Aug. 11, 2021

(65) Prior Publication Data

US 2021/0373674 A1 Dec. 2, 2021

(30) Foreign Application Priority Data

Jun. 17, 2021 (CN) .......................... 202121347791.7

(51) Int. Cl.
| G09G 5/08 | (2006.01) |
| G06F 3/02 | (2006.01) |
| H01H 13/7065 | (2006.01) |
| H01H 13/86 | (2006.01) |

(52) U.S. Cl.
CPC ....... G06F 3/0202 (2013.01); H01H 13/7065 (2013.01); H01H 13/86 (2013.01)

(58) Field of Classification Search
CPC .... H01H 13/7065; H01H 13/70; H01H 13/86; H01H 2221/022; H06F 3/0202; G06F 3/0216; G06F 3/033; G09G 5/08
See application file for complete search history.

(56) References Cited

U.S. PATENT DOCUMENTS

| 6,764,191 | B2* | 7/2004 | Douzono | H01H 13/7006 |
| | | | | 362/85 |
| 7,504,596 | B2* | 3/2009 | Chou | H01H 13/705 |
| | | | | 200/5 A |
| 9,360,948 | B2* | 6/2016 | Alfadli | G06F 3/0219 |
| 10,013,075 | B2* | 7/2018 | Shipman | G06F 3/0238 |
| 2019/0091946 | A1* | 3/2019 | Lancaster-Larocque | |
| | | | | B29C 70/541 |
| 2020/0076432 | A1* | 3/2020 | Lee | G06F 3/023 |
| 2020/0113040 | A1 | 4/2020 | Chen et al. | |
| 2020/0328049 | A1 | 10/2020 | Chen | |

* cited by examiner

*Primary Examiner* — Pegeman Karimi

(57) ABSTRACT

The present utility model discloses a keyboard. The keyboard comprises keys, a fixing frame, long flexible strips, a key locking plate, a flexible sheet, a PCB board, a flexible base, and a bottom cap. The key locking plate is mounted on the upper surface of the flexible sheet. The flexible sheet is mounted on the upper surface of the PCB board. The PCB board is mounted on the flexible base. The flexible base is mounted on the bottom cap. The key locking plate, the flexible sheet, the PCB board and the flexible base fixed in the housing. The long flexible strips are mounted on all sides of the key locking plate and in the fixing frame.

8 Claims, 6 Drawing Sheets

KEYBOARD

TECHNICAL FIELD

The utility model relates to a computer operating device, in particular to a keyboard.

BACKGROUND

The keyboard is a command and data input device used to equipment operation, and a set of function keys used to operate a machine or device under the control of the system. With the development of science and technology, the computer has entered millions of households, making the keyboard the most common and main input device. However, the sound of keyboard percussion is a day-by-day issue for people. Even the noiseless keyboard makes a sound. Especially in the dead of night or in a quiet environment, the sound of keyboard percussion disturbs others when they are sleeping or working.

In addition, after long use of the keys, unintelligible codes may appear on the screen. This is caused by the lower positional precision of a key during its movement. The lower positional precision affects the performance stability of the keyboard during its operation.

SUMMARY OF THE UTILITY MODEL

The purpose of the present utility model is to propose a keyboard to solve one or more technical problems existing in the prior art, or provide at least one beneficial choice or create a condition.

The following technical solution is adopted in the present utility model in order to solve the above technical problem:

A keyboard, which comprises keys, a fixing frame, long flexible strips, a key locking plate, a flexible sheet, a PCB board, a flexible base, and a bottom cap; the key locking plate is mounted on the upper surface of the flexible sheet. The flexible sheet is mounted on the upper surface of the PCB board; the PCB board is mounted on the flexible base; the flexible base is mounted on the bottom cap; the fixing frame is connected with the bottom cap, forming the housing of the keyboard; the key locking plate, the flexible sheet, the PCB board and the flexible base are fixed in the housing. The long flexible strips are mounted on all sides of the key locking plate and in the fixing frame; the key locking plate and the flexible sheet are respectively provided with an upper key hole and a lower key hole, and the key passes through the upper key hole and a lower key hole in turn.

Further, the top of the four walls of the fixing frame extends inwardly to a baffle, the surface of the baffle is provided with a holddown groove, and the long flexible strips are inserted into the holddown groove.

Further, a clamping bulge is provided on the inner side of the four walls of the fixing frame, a clamping slot is provided on the outer side of the four walls of the bottom cap, the clamping bulge is mounted in the clamping slot, and the fixing frame is clamped to the bottom cap.

Further, a limited post is provided at each of the four corners of the bottom cap, and after the fixing frame is connected with the bottom cap, the top of the limited posts presses against the baffle on the fixing frame.

Further, a flexible block is arranged between the limited posts and the baffle.

Further, a key comprises a key body and a key cap; a cross-shaped joint is provided on the upper end of the key body, which is connected with the key cap through the cross-shaped joint; a guide rod and two touch rods are provided on the lower end of the key body, and the guide rod is inserted into the corresponding guide hole on the PCB board; the two touch rods are used to pass through the corresponding through holes on the PCB board to touch the relevant contact switches.

Further, three guide rods are provided on the key body, and three guide holes corresponding to the guide rods are provided on the PCB board.

Further, a battery slot is provided on the flexible base, and a battery is arranged in the battery slot, and the battery is used to provide power for the PCB board.

The utility model has the advantages that:

In the present patent, flexible sheet is additionally provided on the key locking plate and the PCB board, and a flexible base is additionally provided between the PCB board and the bottom cap, thereby reducing noise; the noise is further reduced because the long flexible strips are arranged on all sides of the key locking plate and in the fixing frame.

A flexible block is additionally provided between the limited posts of the bottom cap and the fixing frame in order to achieve a better effect of vibration and noise reduction;

The long flexible strips are fastened in the holddown groove on the baffle of the fixing frame to effectively prevent the long flexible strips from moving to achieve a good effect of isolation and vibration reduction;

Because a guide road is additionally provided on the key body, the displacement accuracy of the key is ensured; because touch rods are adopted, the stability of key operation is ensured.

BRIEF DESCRIPTION OF THE DRAWINGS

The present utility model is further explained with the Figures, but the embodiments in the Figure do not constitute any limitation on the present utility model. For those skilled in the art, without creative work, other Figures can be obtained according to the following Figures.

Figure 1:
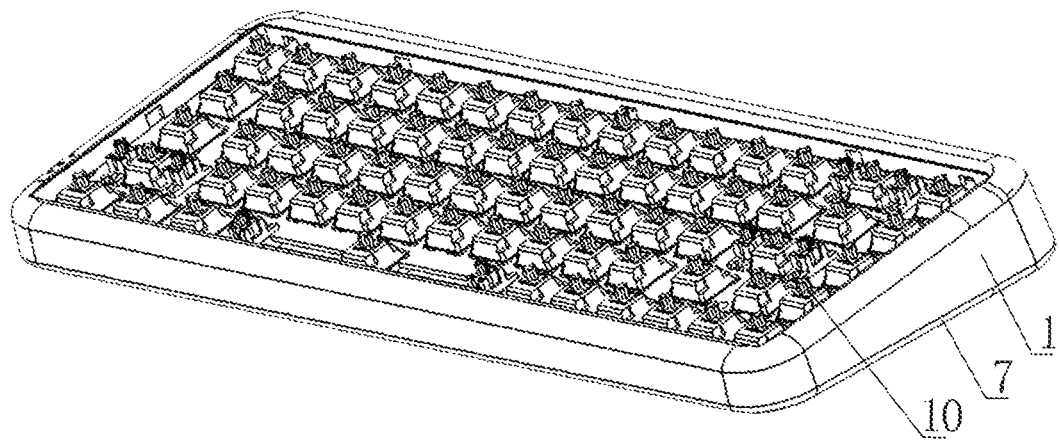
FIG. 1 is a structural schematic diagram of the utility model.
Figure 2:
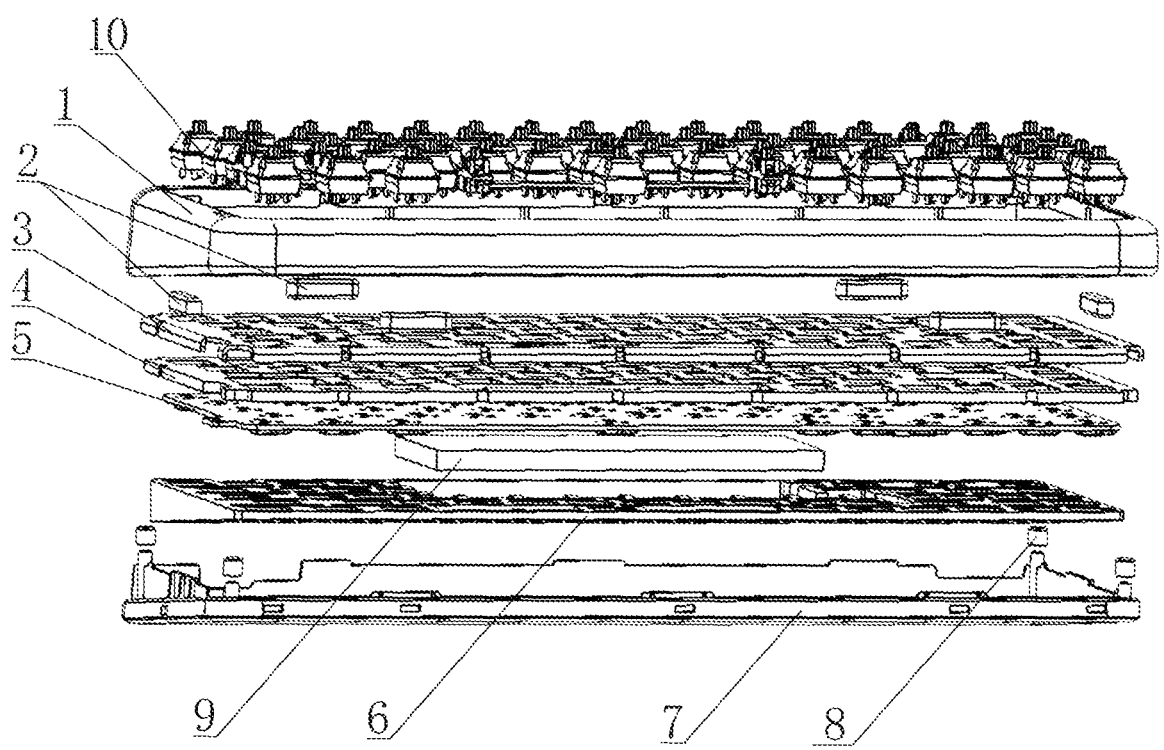
FIG. 2 is an exploded view shown in FIG. 1.
Figure 3:
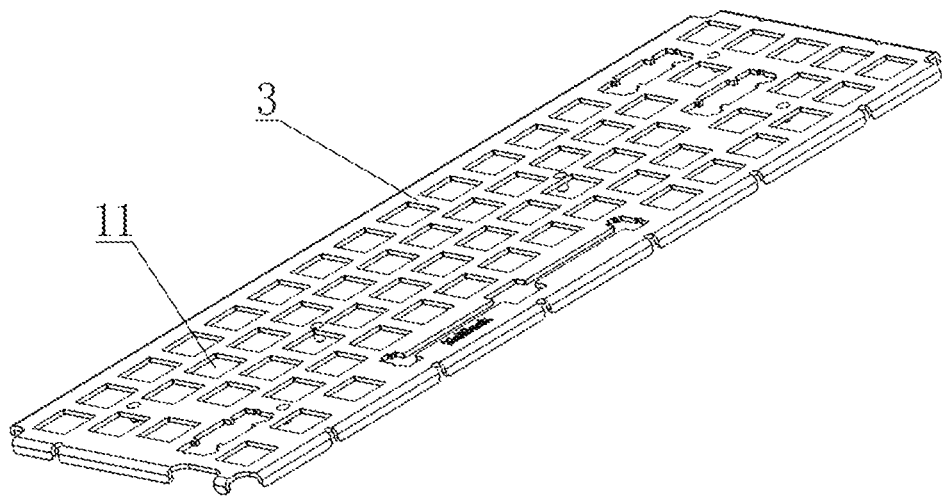
FIG. 3 is a structural schematic diagram of the key locking plate shown in FIG. 2.
Figure 4:
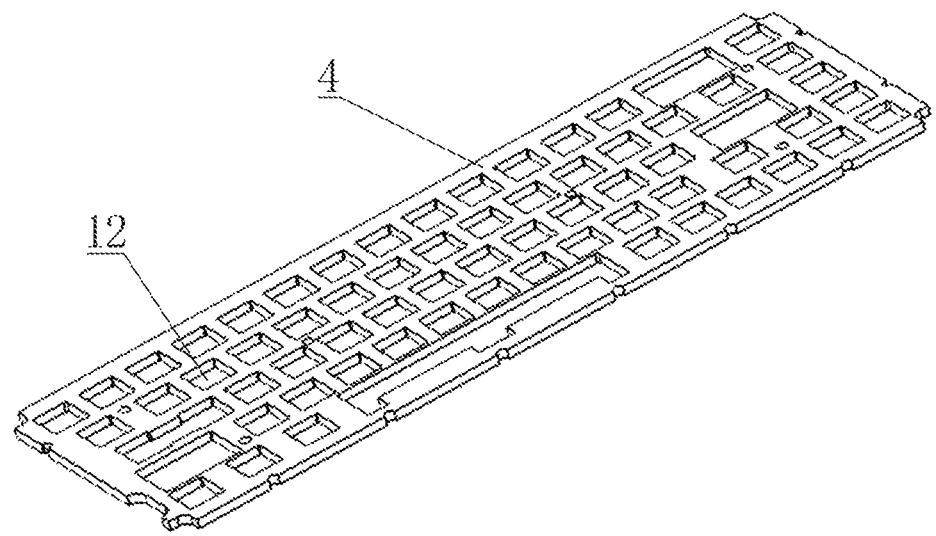
FIG. 4 is a structural schematic diagram of the flexible sheet shown in FIG. 2.
Figure 5:
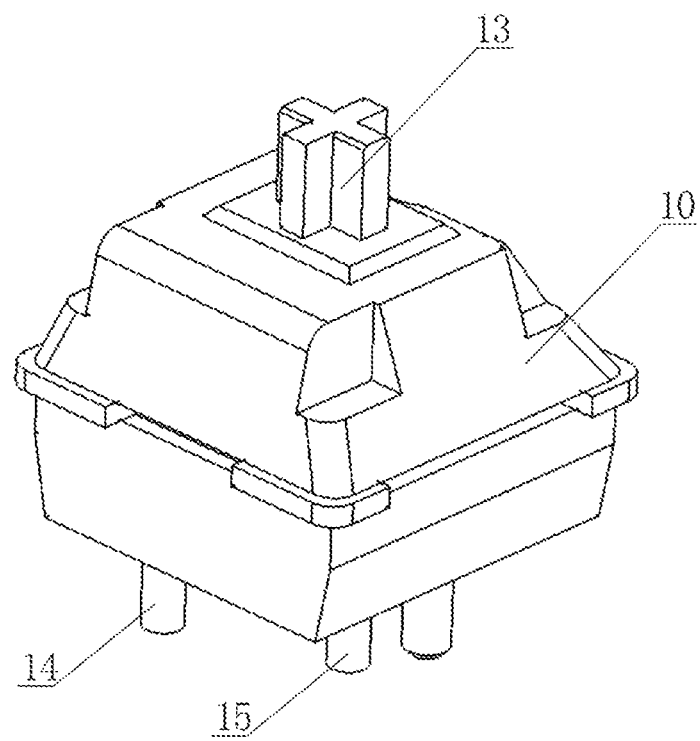
FIG. 5 is a structural schematic diagram of the key body shown in FIG. 2.
Figure 6:
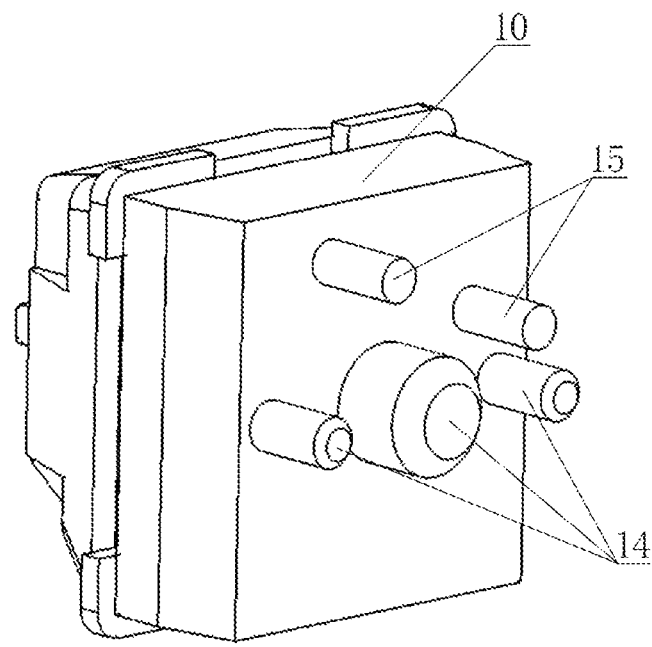
FIG. 6 is an oblique view shown in FIG. 5.
Figure 7:
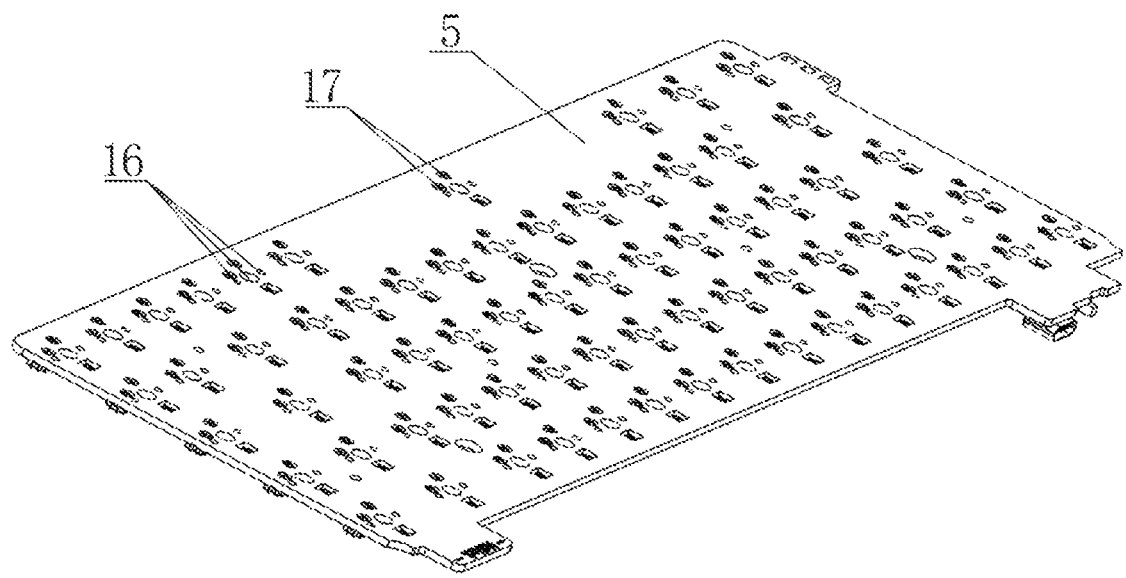
FIG. 7 is a structural schematic diagram of the upper surface of the PCB board shown in FIG. 2.
Figure 8:
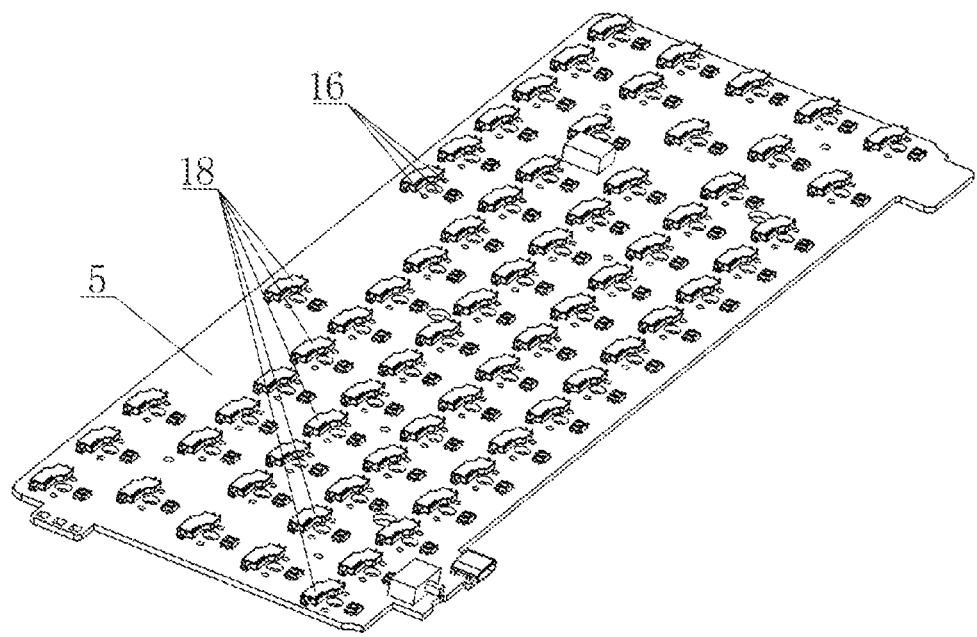
FIG. 8 is a structural schematic diagram of the lower surface of the PCB board shown in FIG. 2.

In the Figures: 1. Fixed frame; 2. Long flexible strip; 3. Key locking plate; 4. Flexible sheet; 5. PCB board; 6. Flexible base; 7. Bottom cap; 8. Flexible block; 9. Battery; 10. Key body; 11. Upper key hole; 12. Lower key hole; 13. Cross-shaped joint; 14. Guide rod; 15. Touch rod; 16. Guide hole; 17. Through hole; 18. Contact switch; 19. Battery slot;

20. Baffle; 21. Fixing slot; 22. Champing bulge; 23. Clamping groove; 24. Limited post.

EMBODIMENTS

The present utility model will be described in greater detail below based on the Figures and embodiments in order to enable those skilled in the art to better understand the technical solution of present utility model. It should be noted that the embodiments of the present application and the features in the embodiments could be combined with each other given the absence of a conflict.

In the description of the present utility model, it should be understood that the directional or positional relationships indicated by the terms "center", "longitudinal", "horizontal", "length", "width", "thickness", "upper surface", "lower surface", "front", "behind", "left" and "right", "vertical", "horizontal", "top", "bottom", "inner", "outer", "clockwise rotation", "reverse rotation", "radial direction", "circumferential direction", etc. are the directional or positional relationships based on the Figures. The terms are only used to easily describe the present utility model and simplify the description rather than indicate or imply that the relevant device or component must be directionally fixed or constructed and operated in a specific direction. Therefore, they cannot be understood as a limitation on the present utility model.

FIGS. 1, 2, 3, and 4 show a keyboard, which comprises keys, a fixed frame 1, a long flexible strip 2, a key locking plate 3, a flexible sheet 4, a PCB board 5, a flexible base 6 and a bottom cap 7. The key locking plate 3 is mounted on the upper surface of the flexible sheet 4. The flexible sheet 4 is mounted on the upper surface of the PCB board 5. The PCB board 5 is mounted on the flexible base 6. The flexible base 6 is mounted on the bottom cap 7. The fixing frame 1 is connected with the bottom cap 7, forming the housing of the keyboard. The key locking plate 3, the flexible sheet 4, the PCB board 5 and the flexible base 6 are fixed in the housing. The long flexible strip 2 is mounted on all sides of the key locking plate 3 and in the fixing frame 1. The key locking plate 3 and the flexible sheet 4 are respectively provided with an upper key hole 11 and a lower key hole 12.

As shown in FIGS. 5, 6, 7, and 8, a key comprises a key body 10 and a key cap. The key 10 passes through the upper key hole 11 and a lower key hole 12 in turn. To be specific, the cross-shaped joint 13 is provided on the upper end of the key body 10, and the key body 10 is connected with the key cap through the cross-shaped joint 13; the three guide rods 14 and two touch rods 15 are provided on the lower end of the key body 10, and the three guide rods 14 are inserted into the three corresponding guide holes on the PCB board; the two touch rods 15 are used to pass through the corresponding through holes 17 on the PCB board to touch the relevant contact switches 18; because a guide road is additionally provided on the key body, the displacement accuracy of the key is ensured; because touch rods are adopted, the stability of key operation is ensured.

Figure 9:
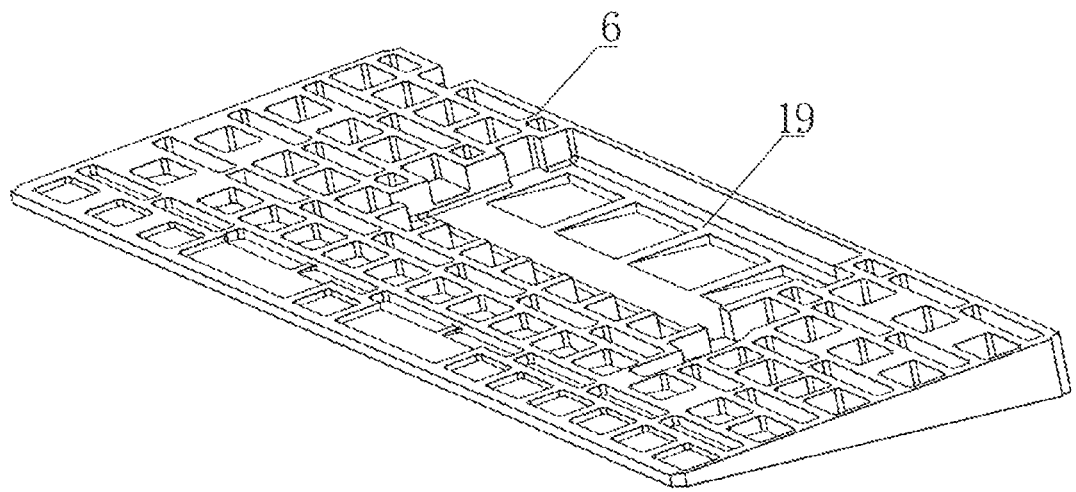
FIG. 9 is a structural schematic diagram of the flexible base shown in FIG. 2.

As shown in FIG. 9, a battery slot 19 is provided on the flexible base 6, and a battery 9 is arranged in the battery slot 19, and the battery 9 is used to provide power for the PCB board 5.

Figure 10:
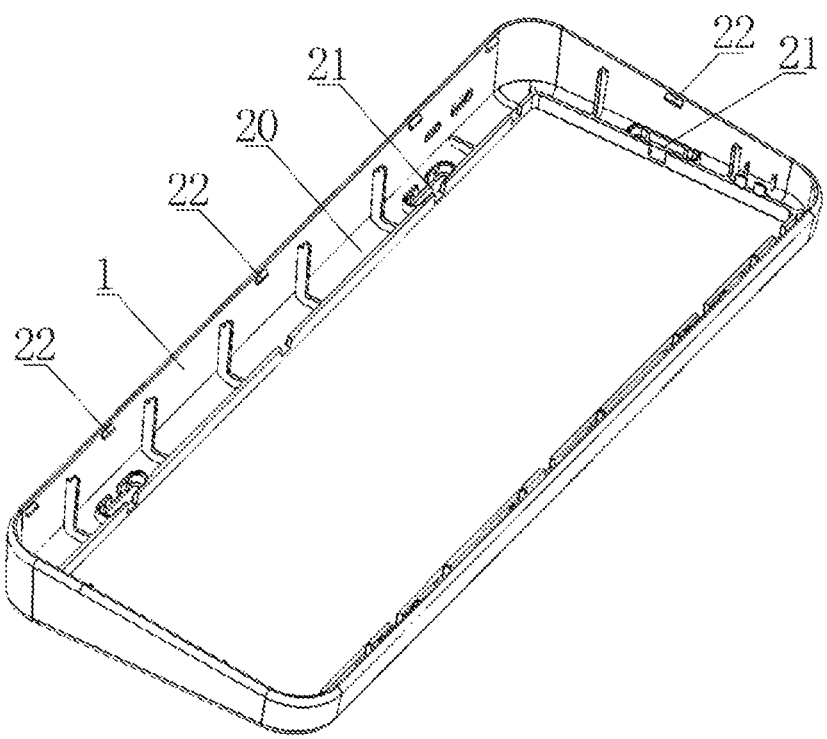
FIG. 10 is a structural schematic diagram of the fixing frame shown in FIG. 2.
Figure 11:
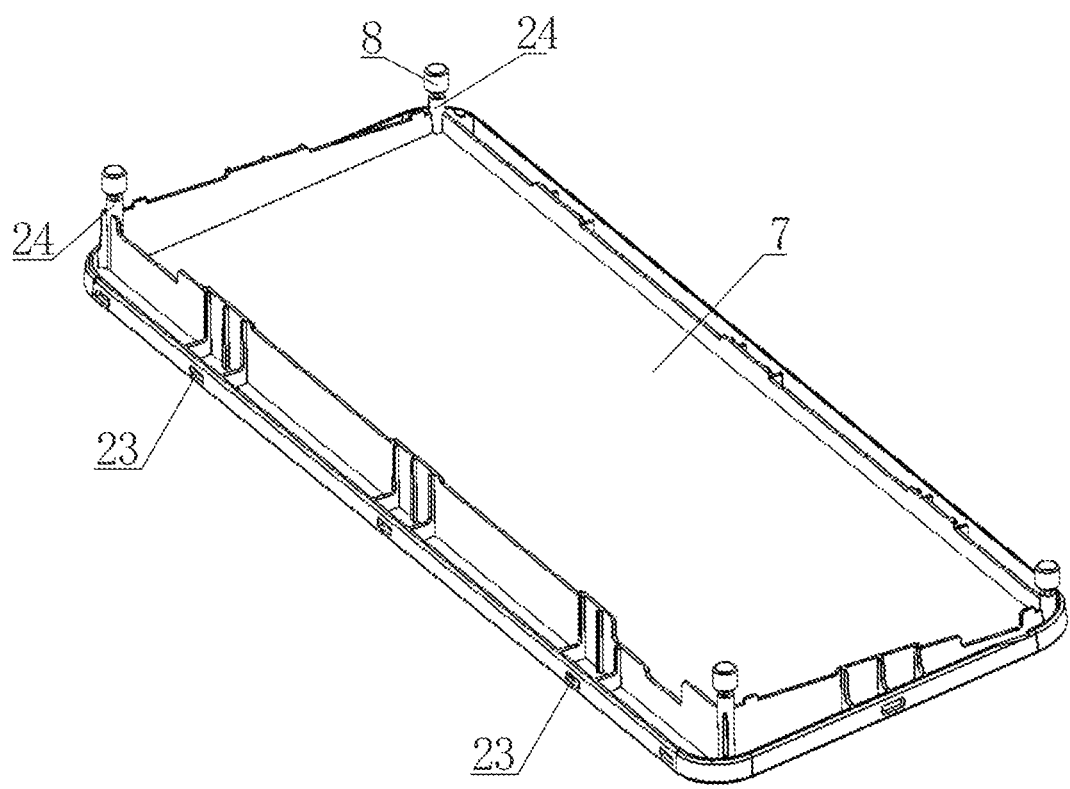
FIG. 11 is a structural schematic diagram of the bottom cap shown in FIG. 2.

As shown in FIGS. 10 and 11, the top of the four walls of the fixing frame 1 extends inwardy to a baffle 20; the surface of the baffle 20 is provided with a holddown groove 21, and the long flexible strip 2 is inserted into the holddown groove 21 to effectively prevent the long flexible strips from moving to achieve a good effect of isolation and vibration reduction.

A clamping bulge 22 is provided on the inner side of the four walls of the fixing frame 1, a clamping slot 23 is provided on the outer side of the four walls of the bottom cap 7, the clamping bulge 22 is mounted in the clamping slot 23, and the fixing frame 1 is clamped to the bottom cap 7.

A limited post 24 is provided at each of the four corners of the bottom cap 7, and after the fixing frame 1 is connected with the bottom cap 7, the top of the limited posts 24 presses against the baffle 20 on the fixing frame 1. A flexible block 8 is arranged between the limited post 24 and the baffle 20 to achieve a better effect of vibration and noise reduction.

In addition, those skilled in the art can combine different embodiments or examples described in this specification together or combine the features of the different embodiments or examples together without contradicting each other. Although the embodiments of the present utility model have been shown and described above, it is understandable that the above embodiments are exemplary and shall not be construed as limiting the present utility model. Those skilled in the art may change, modify, replace and transform the above-mentioned embodiments within the scope of the present utility model.

The invention claimed is:

1. A keyboard, which is characterized in that it comprises keys, a fixing frame, long flexible strips, a key locking plate, a flexible sheet, a PCB board, a flexible base, and a bottom cap; the key locking plate is mounted on the upper surface of the flexible sheet, the flexible sheet is mounted on the upper surface of the PCB board, the PCB board is mounted on the flexible base, the flexible base is mounted on the bottom cap, the fixing frame is connected with the bottom cap, forming the housing of the keyboard, the key locking plate, the flexible sheet, the PCB board and the flexible base are fixed in the housing, and the long flexible strips are mounted on all sides of the key locking plate and in the fixing frame; the key locking plate and the flexible sheet is respectively provided with an upper key hole and a lower key hole; the key passes through the upper key hole and a lower key hole in turn.

2. The keyboard of claim 1, is characterized in that the top of the four walls of the fixing frame extends inwardy to a baffle, the surface of the baffle is provided with a holddown groove, and the long flexible strips are inserted into the holddown groove.

3. The keyboard of claim 2, is characterized in that a clamping bulge is provided on the inner side of the four walls of the fixing frame, a clamping slot is provided on the outer side of the four walls of the bottom cap, the clamping bulge is mounted in the clamping slot, and the fixing frame is clamped to the bottom cap.

4. The keyboard of claim 3, is characterized in that a limited post is provided at each of the four corners of the bottom cap, and after the fixing frame is connected with the bottom cap, the top of the limited posts presses against the baffle on the fixing frame.

5. The keyboard of claim 4, is characterized in that a flexible block is arranged between the limited posts and the baffle.

6. The keyboard of claim 5, is characterized in that a key comprises a key body and a key cap; a cross-shaped joint is provided on the upper end of the key body, which is connected with the key cap through the cross-shaped joint; a guide rod and two touch rods are provided on the lower end of the key body, and the guide rod is inserted into the corresponding guide hole on the PCB board; the two touch rods are used to pass through the corresponding through holes on the PCB board to touch the relevant contact switches.

7. The keyboard of claim 6, is characterized in that three guide rods are provided on the key body, and three guide holes corresponding to the guide rods are provided on the PCB board.

8. The keyboard of claim 7, is characterized in that a battery dot is provided on the flexible base, and a battery is arranged in the battery dot, and the battery is used to provide power for the PCB board.

* * * * *